UNITED STATES PATENT OFFICE.

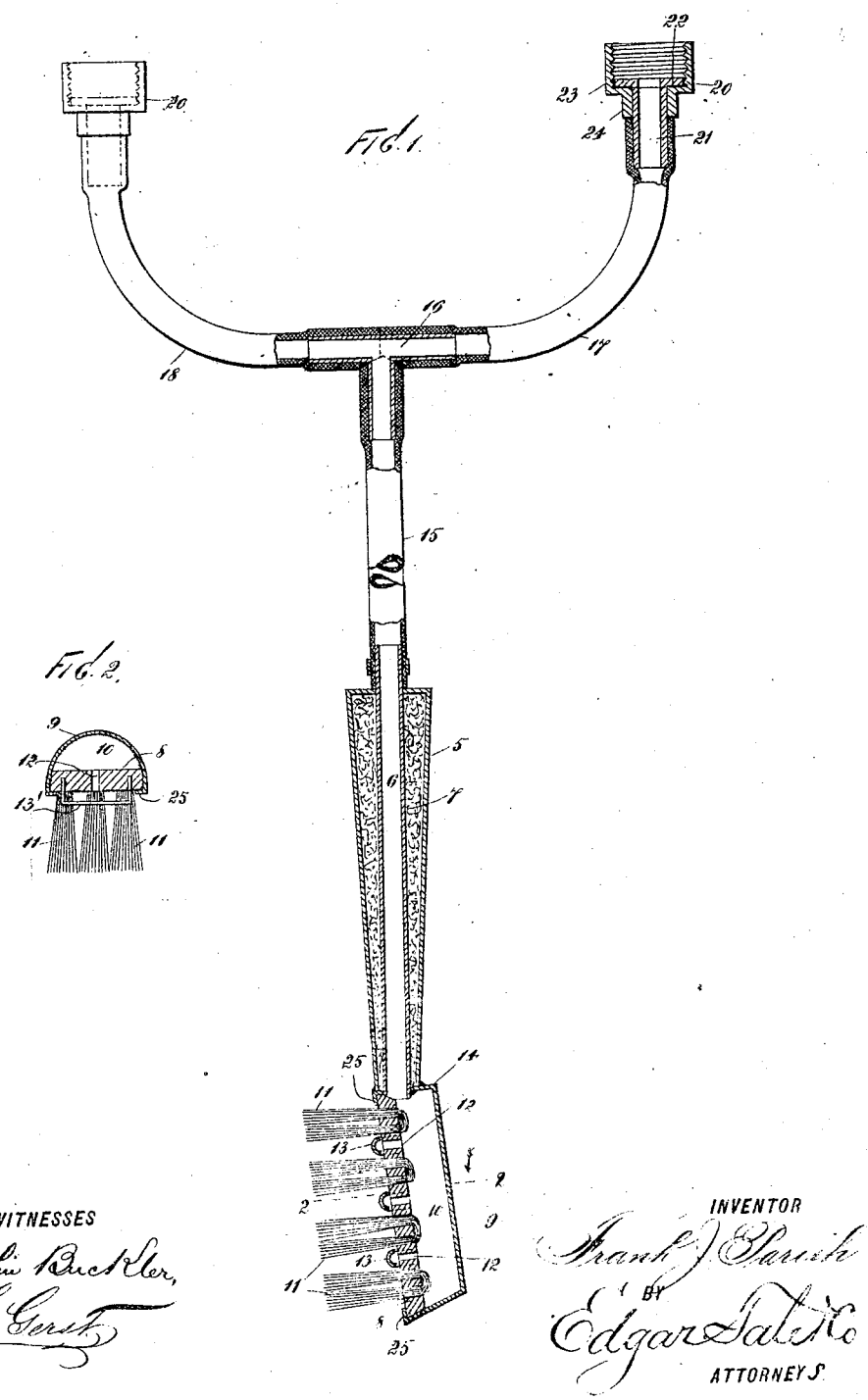

FRANK JOS. PARISH, OF NEW YORK, N. Y.

FOUNTAIN-BRUSH.

SPECIFICATION forming part of Letters Patent No. 617,882, dated January 17, 1899.

Application filed November 12, 1896. Renewed April 13, 1898. Serial No. 677,520. (No model.)

*To all whom it may concern:*

Be it known that I, FRANK JOS. PARISH, a citizen of the United States, residing at New York, in the county of New York and State of New York, have invented certain new and useful Improvements in Fountain-Brushes, of which the following is a full and complete specification, such as will enable those skilled in the art to which it appertains to make and use the same.

This invention relates to fountain-brushes; and the object thereof is to provide an improved device of this class, which is adapted to be used in connection with a hot and cold water supply.

The invention is fully disclosed in the following specification, of which the accompanying drawings form a part, in which—

Figure 1 is a sectional side view of my improved fountain-brush; and Fig. 2, a section on the line 2 2 thereof, showing a slight modification of the form of the shield.

In the drawings forming a part of this specification the separate parts of my improvement are designated by the same numerals of reference throughout the several views, and in practice I provide a fountain-brush device which comprises a handle consisting of a tubular casing 5, through which passes a tube 6, and between the tubular casing 5 and the tube 6 is an annular chamber 7, which is filled with any suitable non-heat-conducting material, such as asbestos, or any preferred substance.

The annular chamber 7 is closed at both ends, and the casing 5 is preferably smaller at one end than at the other, and secured to the end of the tube which projects through the casing 5 of the handle is a hollow brush-head, which comprises a board or plate 8, which is provided with a back casing 9, whereby a chamber 10 is formed, with which the tube 6 communicates, and the plate or board 8 is provided with a plurality of tufts 11, composed of bristles or any desired material, and formed in the plate or board 8, between the separate tufts 11, are ports or openings 12, over each of which is placed a shield 13, and the water passes through the openings 12 and is deflected onto the tufts 11 by the shields 13, it being of course understood that the shields are open at the sides. The head 14, which is secured to the outer end of the tube 6, may, however, be of any desired shape, form, or construction, the object thereof being to provide a suitable brush, the body portion of which is provided with a chamber with which the tube 6 communicates and through the side of which is formed a plurality of openings by means of which the water is conducted to the brush or the separate parts thereof.

The end of the tube 6 opposite the brush or head 14 is provided with a flexible tube 15, and I also provide a tubular T-shaped coupling 16, with one branch of which the tube 15 is connected, and I also employ two other flexible tubes 17 and 18, which are connected with the other branches of said coupling, and each of which is provided at its end with a suitable coupling-head 20, by means of which connection is made between the tubes 17 and 18 and a hot and cold water supply. These couplings 20 may be of any desired form; but I prefer to employ a tube 21, provided at one end with an annular flange or rim 22 and also a suitable coupling-head 23, which is tubular in form and open at one end and provided at the other end with a tubular extension 24, and the tube 21 is inserted through the tubular extension 24, as shown in Fig. 1, and the tubes 17 and 18 are connected therewith.

The operation will be readily understood from the foregoing description when taken in connection with the accompanying drawings and the following statement thereof.

The tubes 17 and 18 are connected with the hot and cold water supply in the usual manner, and it will be understood that said hot and cold water supplies are provided with cocks or valves, whereby either one or both may be turned on when desired and whereby the amount of water flowing through either of the tubes 17 and 18 may be regulated. The handle of the device is then grasped in one hand and the dish or other article to be washed in the other, and as the water flows through the handle and through the brush the latter is rubbed over the surface of the dish or other article, as will be readily understood. The object of the shields 13 over the ports or passages 12 is to prevent the water from being thrown directly out between the separate parts of the brush and to insure a distribution therethrough, and it will be apparent that this device may be used for washing pots, kettles, and various other kitchen utensils, as well as for washing dishes.

The shields 13 over the openings 12 in the plate or board 8 of the brush are preferably curved in cross-section, as shown in Fig. 1; but the shields may be of the form shown at 13' in Fig. 2. Either construction facilitates the operation of the device, the water being directed upon the bases of the brushes instead of being thrown directly outwardly, and the plate or board 8 is secured in or to the casing by crimping the edges of the casing thereof, as shown at 25 in said figure and also in Fig. 2.

It will thus be seen that I accomplish the object of my invention by means of a device which is simple in construction and operation and comparatively inexpensive, and it is apparent that changes in and modifications of the construction herein described may be made without departing from the spirit of my invention or sacrificing its advantages.

Having fully described my invention, I claim as new and desire to secure by Letters Patent—

The combination in a fountain-brush, of a handle consisting of a tubular casing filled with non-heat-conducting material, a hollow brush-head secured to one end of said handle and provided with a number of openings on the brush side thereof, shields placed over said openings, a tube passing through said handle and connected with said brush-head, a coupling at the other end of said tube and a plurality of tubes provided with coupling ends secured to said coupling, substantially as shown and described.

In testimony that I claim the foregoing as my invention I have signed my name, in presence of the subscribing witnesses, this 10th day of November, 1896.

FRANK JOS. PARISH.

Witnesses:
C. GERST,
L. M. MULLER.